US008654814B2

(12) United States Patent
Beeler et al.

(10) Patent No.: US 8,654,814 B2
(45) Date of Patent: Feb. 18, 2014

(54) EMBEDDED META-CARRIER WITH SPREAD SPECTRUM FOR PERIODIC-BURST CARRIERS VIA OVERLAID CARRIERS (75) Inventors: Michael Beeler, Jefferson, MD (US); Cris M. Mamaril, Mesa, AZ (US); Jeffery Harig, Mesa, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 372 days.

(21) Appl. No.: 13/044,446

(22) Filed: Mar. 9, 2011

(65) Prior Publication Data

US 2012/0082185 A1 Apr. 5, 2012

Related U.S. Application Data (63) Continuation-in-part of application No. 13/024,402, filed on Feb. 10, 2011, and a continuation-in-part of application No. 13/024,951, filed on Feb. 10, 2011.

(60) Provisional application No. 61/389,130, filed on Oct. 1, 2010.

(51) Int. Cl.
*H04B 1/00* (2006.01)

(52) U.S. Cl.
USPC ........... 375/130; 375/134; 375/133; 375/135; 375/136; 375/140; 375/211; 370/319; 370/320; 370/321; 370/322

(58) Field of Classification Search
USPC ......... 375/130, 134, 133, 135, 136, 140, 211; 370/319, 320, 321, 322
See application file for complete search history.

(56) References Cited

U.S. PATENT DOCUMENTS

| | | | |
|---|---|---|---|
| 5,245,612 A | 9/1993 | Kachi et al. | |
| 5,537,397 A | 7/1996 | Abramson | |
| 6,020,845 A * | 2/2000 | Weinberg et al. | 342/354 |
| 6,985,512 B1 | 1/2006 | McDermott et al. | |
| 7,227,884 B2 | 6/2007 | McDermott | |
| 7,433,391 B2 | 10/2008 | Stafford et al. | |
| 7,596,170 B2 | 9/2009 | McDermott et al. | |
| 2002/0021721 A1 | 2/2002 | Jiang et al. | |
| 2002/0126639 A1* | 9/2002 | Schilling | 370/335 |
| 2003/0058810 A1 | 3/2003 | Petronic | |
| 2006/0012376 A1* | 1/2006 | Furse et al. | 324/534 |
| 2007/0264939 A1* | 11/2007 | Sugar | 455/67.11 |
| 2009/0059850 A1* | 3/2009 | Jung et al. | 370/329 |
| 2010/0291865 A1* | 11/2010 | Gore et al. | 455/7 |

* cited by examiner

*Primary Examiner* — Zewdu Kassa
(74) *Attorney, Agent, or Firm* — Booth Udall Fuller, PLC (57) ABSTRACT

A method for identifying the presence of an electronic transmission comprising detecting, by a detecting device, the presence of a burst of electromagnetic energy that results from the presence of an original carrier signal and transmitting, by a transmitting device, a spread spectrum meta-carrier signal within a portion of a bandwidth of the original carrier signal, wherein the meta-carrier signal contains information about the original carrier signal and is transmitted such that the meta-carrier signal occupies at least a portion of a bandwidth of the original carrier signal during the presence of the burst of electromagnetic energy.

54 Claims, 8 Drawing Sheets

EMBEDDED META-CARRIER WITH SPREAD SPECTRUM FOR PERIODIC-BURST CARRIERS VIA OVERLAID CARRIERS

CROSS REFERENCE TO RELATED APPLICATIONS

This document is a continuation in part of currently pending U.S. patent application Ser. No. 13/024,402, entitled "Embedded Meta-Carrier with Spread Spectrum Via Overlaid Carriers" to Michael Beeler, et al., which was filed on Feb. 10, 2011 and U.S. patent application Ser. No. 13/024,951, entitled "A Method and System for Transmission of Identification via Metadata for Repeating Relays using Spread-Spectrum Technology" to Frederick Morris, et al., which was filed on Feb. 10, 2011, the disclosures of which are herein incorporated by reference in their entirety. This document also claims the benefit of the filing date of U.S. Provisional Patent Application No. 61/389,130, entitled "Embedded Meta-Carrier with Spread Spectrum for Periodic-Burst Carriers via Overlaid Carriers" to Michael Beeler et al., which was filed on Oct. 1, 2010, the disclosure of which is hereby incorporated entirely by reference herein.

BACKGROUND

1. Technical Field

Aspects of this document relate generally to telecommunication systems and techniques for transmitting data across a telecommunication channel.

2. Background Art

Since the introduction of electromagnetic (EM) transmission, a recurring problem continuing to challenge the industry is the identification of the periodic-burst carrier. This problem is most prevalent in the Time Division Multiple Access (TDMA) Very Small Aperture Terminal (VSAT) satellite industry.

The need to identify a carrier may be due to failed equipment that results in the transmission equipment transmitting or sweeping the wrong spectral location or locations. In this event this carrier is known as a "rogue carrier." A second need to identify a carrier may be due to an improperly configured carrier which is primarily due to human error. In many situations, the rogue or improperly configured carrier results in service disruption due to interference with a carrier assigned to operate in the same occupied spectrum. Thus, a need exists for one skilled in the art to rapidly identify the source of the interfering carrier.

SUMMARY

Implementations of a method for identifying the presence of an electronic transmission may comprise detecting, by a detecting device, the presence of a burst of electromagnetic energy that results from the presence of an original carrier signal and transmitting, by a transmitting device, a spread spectrum meta-carrier signal within a portion of a bandwidth of the original carrier signal, wherein the meta-carrier signal contains information about the original carrier signal and is transmitted such that the meta-carrier signal occupies at least a portion of a bandwidth of the original carrier signal during the presence of the burst of electromagnetic energy.

Particular implementations may comprise one or more of the following features. The original carrier signal may comprise information as to the identity of the original carrier signal. The original carrier signal may be without information as to an identity of the original carrier signal. The method may further comprise detecting, by the detecting device, the presence of multiple bursts of electromagnetic energy that result from the presence of an original carrier signal. The meta-carrier signal may occupy the entire bandwidth of the original carrier signal during the presence of each burst of electromagnetic energy. The method may further comprise detecting a center frequency and bandwidth of the original carrier signal. The method may further comprise applying an $n^{th}$ order non-linearity to the original carrier signal. The center frequency and bandwidth of the original carrier signal may be detected using a Fourier Transform method. The method may further comprise extracting, using a directional coupler, the presence of the original carrier signal for embedding the meta-carrier signal. The method may further comprise determining a power level of the original carrier signal during the presence of the burst of electromagnetic energy. The method may further comprise muting, using a muting device, output of the meta-carrier until transmission is enabled. The meta-carrier signal may have a fixed duration that results in the meta-carrier signal occupying a narrow bandwidth within the burst of electromagnetic energy. The meta-carrier signal may comprise a number of symbols that is less than a number of symbols that comprises complete meta-data. The method may further comprise detecting multiple bursts wherein the number of symbols of each burst is less than the number of symbols of the complete meta-data. The meta-carrier signal may be contained within a 3 dB bandwidth of the burst of electromagnetic energy. The meta-carrier signal may extend beyond the bandwidth of the burst of electromagnetic energy. The method may further comprise embedding, using an embedding device and combining the meta-carrier signal with the original carrier signal such that a composite carrier signal results.

The method may further comprise encoding, using an encoder, the meta-carrier signal, modulating, using a modulator, the encoded meta-carrier signal received from the encoder, spreading, using a spreader, the modulated meta-carrier signal, and combining, using a meta-carrier embedding device, the spread meta-carrier signal and the original carrier signal such that a composite carrier signal results. The meta-carrier signal may be a limited duty cycle data sequence comprising a sequence of bits. The sequence of bits may comprise a serial number or unique data sequence. The method may further comprise outputting stored meta-carrier information as a repeating sequence of bytes and identifying the meta-carrier using a unique string of bits within the repeating sequence of bytes, the unique string of bits being unique to a transmission site. The method may further comprise embedding, using a directional coupler, the meta-carrier signal within the original carrier signal such that a composite carrier signal results. The method may further comprise storing, by the detecting device, a sequence of data detected during the presence of the burst of electromagnetic energy.

The method may further comprise determining a time delay to impose such that a beginning of a burst electromagnetic energy is estimated and decoding with a decoder, the meta-carrier signal at the beginning of the burst of electromagnetic energy. The method may further comprise separating, by a separating device, the composite carrier signal in to the original carrier signal and the spread meta-carrier signal, despreading, using a despreader, the spread meta-carrier signal, demodulating, using a demodulator, the despread meta-carrier signal, and decoding, using a decoder, the demodulated meta-carrier signal. The method may further comprise extracting, using an extraction device, the meta-carrier signal from the burst of electromagnetic energy based on the sequence of data stored relating to a prior burst of electromagnetic energy. The method may further comprise determining whether a meta-carrier signal is present by attempting to extract the meta-carrier signal from the composite carrier signal. The method may further comprise using one or more digital signal processing techniques to iteratively process the composite carrier signal to attempt to extract the meta-carrier signal.

Implementations of a system for identifying the presence of an electronic transmission may comprise a detecting device that detects a presence of a burst of electromagnetic energy that results in the presence of an original carrier signal and a transmitting device that transmits a spread spectrum meta-carrier signal within a portion of a bandwidth of the original carrier signal, wherein the meta-carrier signal contains information about the original carrier signal and is transmitted such that the meta-carrier signal occupies at least a portion of a bandwidth of the original carrier signal during the presence of the burst of electromagnetic energy.

Particular implementations may comprise one or more of the following features. The original carrier signal may comprise information as to the identity of the original carrier signal. The original carrier signal may be without information as to an identity of the original carrier signal. The detecting device may further detect the presence of multiple bursts of electromagnetic energy that result from the presence of an original carrier signal. The meta-carrier signal may occupy the entire bandwidth of the original carrier signal during the presence of each burst of electromagnetic energy. The detecting device may detect a center frequency and bandwidth of the original carrier signal. The system may further comprise an $n^{th}$ order non-linearity that is applied to the original carrier signal. The center frequency and bandwidth of the original carrier signal may be detected using a Fourier Transform method. The system may further comprise a directional coupler that extracts the original carrier signal for extracting the meta-carrier signal. The system may further comprise a receiving device that determines a power level of the original carrier signal during the burst of electromagnetic energy. The system may further comprise a muting device that mutes the output of the meta-carrier until transmission is enabled. The meta-carrier signal may have a fixed duration that results in the meta-carrier signal occupying a narrow bandwidth within the burst of electromagnetic energy. The meta-carrier signal may comprise a number of symbols that is less than a number of symbols that comprises complete meta-data. The system may further comprise detecting multiple bursts wherein the number of symbols of each burst is less than the number of symbols of the complete meta-data. The meta-carrier signal may be contained within a 3 dB bandwidth of the burst of electromagnetic energy. The meta-carrier signal extends beyond the bandwidth of the burst of electromagnetic energy. The system may further comprise an embedding device that embeds and combines the meta-carrier signal with the original carrier signal such that a composite carrier signal results.

The system may further comprise an encoder that encodes the meta-carrier signal, a modulator that modulates the encoded meta-carrier signal received from the encoder, a spreader that spreads the modulated meta-carrier signal, and a meta-carrier embedding device that combines the spread meta-carrier signal and the original carrier signal such that a composite carrier signal results. The meta-carrier signal may be a limited duty cycle data sequence comprising a sequence of bits. The sequence of bits may comprise a serial number or unique data sequence. The system may further comprise an output device that outputs stored meta-carrier information as a repeating sequence of bits and an embedding device that generates the meta-carrier as a carrier identification sequence. The system may further comprise a directional coupler that embeds the meta-carrier signal within the original carrier signal such that a composite carrier signal results. The detecting device may store a sequence of data detected during the presence of the burst of electromagnetic energy. The system may further comprise a receiving device that determines a time delay to impose such that a beginning of a burst of electromagnetic energy is estimated and a decoder that decodes the meta-carrier signal at the beginning of the presence of a burst of electromagnetic energy. The system may further comprise a separating device that separates the composite carrier signal in to the original carrier signal and the spread meta-carrier signal, a despreader that dispreads the spread meta-carrier signal, a demodulator that demodulates the despread meta-carrier signal, and a decoder that decodes the demodulated meta-carrier signal. The system may further comprise an extraction device that extracts the meta-carrier signal from the burst of electromagnetic energy based on the sequence of data stored relating to a prior burst of electromagnetic energy. The system may further comprise an extraction device that attempts to extract the meta-carrier signal from the composite carrier signal and determines whether a meta-carrier signal is present. The system may further comprise a digital signal processor that uses one or more digital signal processing techniques to iteratively process the composite carrier signal to attempt to extract the meta-carrier signal.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Description, Drawings, or Claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure relates to, but is not limited to, improved embedding of the metadata information techniques for burst type carriers. In some implementations, the burst meta-carrier information could be replaced with telemetry, coordinate (latitude and longitude manually entered or provided by a Global Positioning System (GPS) automatically), user data, etc. Particular implementations described herein are and may use, but are not limited to, Field-Programmable Gate Array (FPGA), Complex Programmable Logic Device (CPLD), Programmable Interface Controller (PIC), Digital Signal Processor (DSP), Application Specific Integrated Circuit (ASIC) or microprocessors.

While the problem of identifying a periodic burst carrier is most prevalent in the Time Division Multiple Access (TDMA) Very Small Aperture Terminal (VSAT) satellite industry, one of ordinary skill in the art would recognize that the technology described in this disclosure is not limited to TDMA VSAT satellite transmission systems and may be used with any applicable system.

Particular implementations may assume that the initial configuration of the transmitting device is known and properly configured, but as described in this document, metadata may be extracted from the carrier dynamically through digital signal processing, analysis, or statically entered by a user.

This disclosure, its aspects and implementations, are not limited to the specific components, frequency examples, redundancy configurations or methods disclosed herein. Many additional components and assembly procedures known in the art consistent with embedding meta-data techniques for periodic-burst carriers are in use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

This disclosure relates to methods and systems for embedding information into a periodic-burst carrier to help identify an electromagnetic transmission's origin. In a burst-carrier environment, the duration of the burst is small; typically, but not limited to, tens to a few hundred milliseconds in duration, so the amount of information that can be transmitted may be a limited number of bits, e.g. less than 80 bits. The ability to detect a burst carrier and provide information about the burst carrier may include information about the transmission equipment such as by non-limiting example, the manufacturer, model, serial number, configuration, etc. One of ordinary skill in the art will recognize that the methods provided in this disclosure may be employed for an electromagnetic emitting device that uses periodic-bursts, such as optical or Radio Frequency (RF) transmission equipment for point-to-point, point-to-multipoint and/or multipoint-to-multipoint for embedded information.

Particular implementations of meta-carrier systems for burst carriers disclosed herein may be specifically employed in satellite communications systems. However, as will be clear to those of ordinary skill in the art from this disclosure, the principles and aspects disclosed herein may readily be applied to any electromagnetic (IF, RF and optical) communications system, such as cellular phone or terrestrial broadcast network without undue experimentation.

Figure 2:
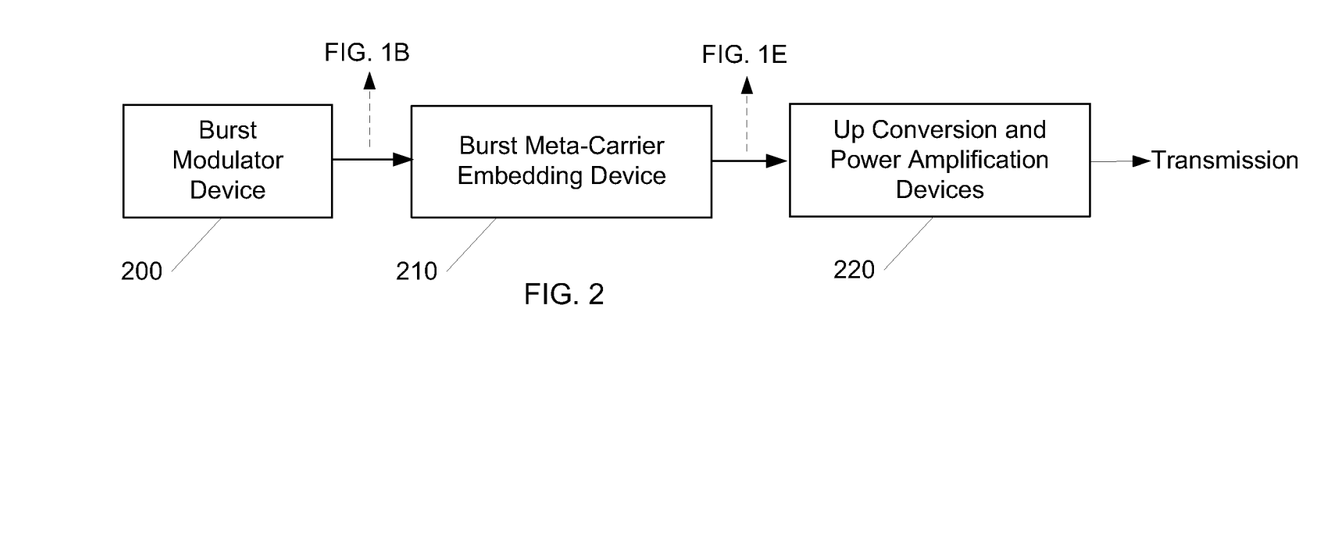
FIG. 2 is a block diagram of an implementation of an external "inline" burst meta-carrier insertion configuration.
Figure 3:
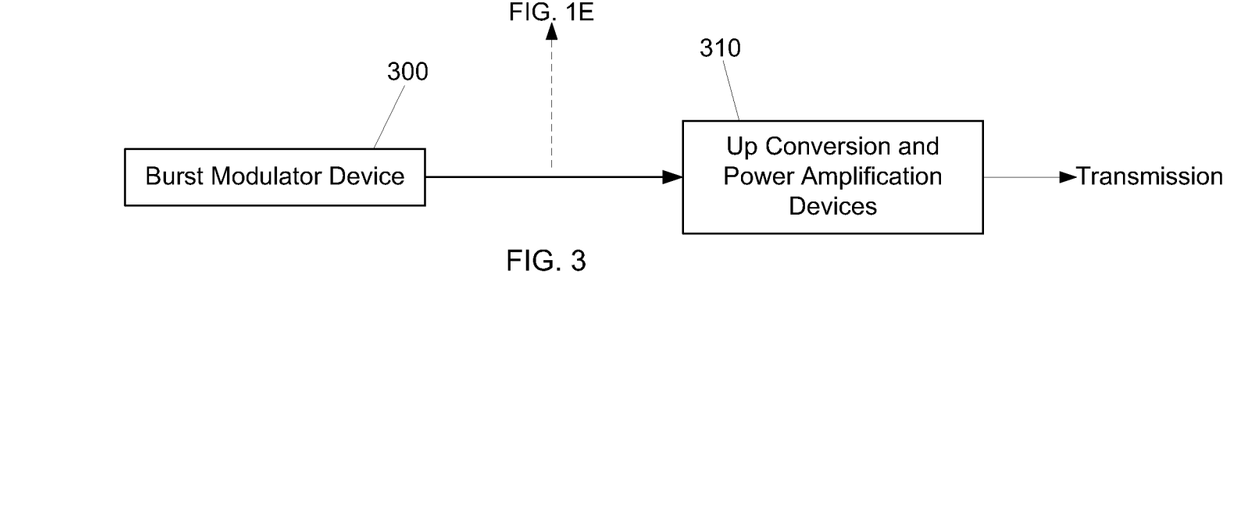
FIG. 3 is a block diagram of an implementation of an internal "direct" burst meta-carrier insertion configuration.

Particular implementations operate on either a burst modulated carrier prior to up conversion and power amplification or at baseband. The embedding of the burst meta-carrier information may operate in an inline configuration as shown in FIG. 2 or a direct configuration as shown in FIG. 3, so the composite (original burst carrier and the burst meta-carrier) received signal may employ digital signal processing (DSP) techniques such as adaptive filtering or equalization, which can be easily implemented in Field-Programmable Gate Array (FPGA), Complex Programmable Logic Device (CPLD), Programmable Interface Controller (PIC), Digital Signal Processor (DSP), Application Specific Integrated Circuit (ASIC) or microprocessors using conventional implementation methods known in the art with knowledge of this disclosure.

Aspects of this disclosure relate to implementations of a method and system for creating a composite burst signal from the original desired burst carrier and the burst meta-carrier for burst transmission, and reception, burst demodulation, decoding and processing of the burst meta-carrier and the original burst carrier.

A method for embedding information about the burst carrier is accomplished by first determining the presence of the burst, the center frequency, occupied bandwidth and power level; and then combining the "original-burst carrier" with the desired information, regardless of the modulation type, rate or forward error correction with a low-data rate carrier (containing information about, but not limited to, the equipment used to transmit the burst carrier known as the metadata). The low-data rate carrier may be spread with a direct sequence spread spectrum (DSSS) waveform and is known as the "burst meta-carrier." The process of spreading the low-data rate carrier and combining with the original-burst carrier are shown in FIGS. 1A-E. A novel aspect of this disclosure is found in determining the presence of the burst, ascertaining the center frequency, occupied bandwidth, power level, and then spreading the burst meta-carrier by a significantly larger bandwidth based on a spread factor many times the original-burst meta-carrier's data rate, resulting in a miniscule amount of noise being added to the original. The transmission of the burst meta-carrier lags in time from the actual start of original burst, since the original burst carrier must be analyzed, and upon determination of the burst carrier's characteristics, the burst meta-carrier is added at a later time during the duration of the original burst carrier. Additionally, the act of spreading the burst meta-carrier information by many times (tens, hundreds, thousands or even millions of times) results in tremendous coding gain that may be realized to extract the carrier burst meta-data from the received combined original burst carrier and burst meta-carrier for decoding the original burst carrier information and burst meta carrier (meta-data information) from the composite burst carrier. The composite-burst carrier demonstrates an aspect in an operational configuration.

The method for embedding information may be accomplished at a relay point such as a terrestrial repeater, airborne or a satellite relay. Though the original carrier(s) may not have originated at the relay location, the relay point may be recognized as a collection point for carriers, combined, power amplified and re-transmitted. Metadata about the relay may be embedded into the spectrum with the original carrier(s) as depicted in FIGS. 1A-E. Information about the relay may be transmitted by combining the original carrier(s) with the burst meta-carrier information, regardless of the modulation type, rate or forward error correction, with a low-data rate, burst meta-carrier (containing information about the desired carrier known as the metadata). A novel aspect of this disclosure may also be found in the burst detection, determination of the center frequency, occupied bandwidth and power level combined with the embedded meta-carrier which may be used as a beacon to identify the source of the relay.

FIGS. 1A-E illustrate a particular implementation of a burst communications transmission carrier wherein the output has been modulated to IF/RF. In this diagram, the output of the modulating equipment contains a single modulated carrier $x_{orig}(t)=A_I \cos(\omega_c t)+A_Q \sin(\omega_c t)$ as represented as $X_{orig}$ containing no information about the origin, configuration, etc. of the source transmission, or any embedded information. FIGS. 1A-E illustrate a burst (non-continuous) carrier where the carrier is only present when user information must be transmitted. When no user information is to be transmitted, the carrier is in an off, or muted, configuration. In a muted configuration, no burst meta-carrier is output.

In the present description, the ephemeral nature of and use of a "burst carrier" is addressed and provisions are made to directly address the rapid detection of a burst carrier, applying an abbreviated meta-carrier, combining the original carrier with the burst meta-carrier and the detecting the combined carrier by a receiving device specifically configured to detect a burst meta-carrier. Prior, related patent applications describe the overall concept, but assume that the carrier time duration is long or even constant and, thus, do not specifically teach the advantages of using a burst carrier. The long duration or constant carrier experiences little change and thus, no special methods are needed to stop transmitting the meta-carrier as a result of bursting. When burst meta-carrier is utilized, the duration of a burst carrier must be kept as short and confined as possible, since the communication channel may be shared by many other communications devices (burst carriers) over an allocated spectrum. The present disclosure teaches methods to ensure the meta-carrier is rapidly muted upon detection of when the burst carrier's energy is no longer present. The burst carrier's short duration (ephemeral existence) may involve an embodiment of a method that is described in this disclosure.

Figure 1A:
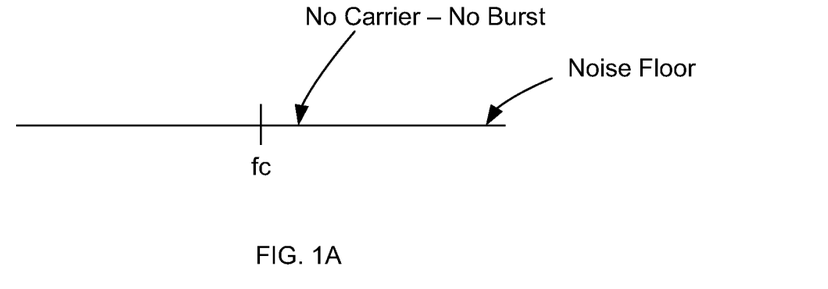
FIGS. 1A-E depict representations of an embedded meta-carrier waveform.
Figure 1B:
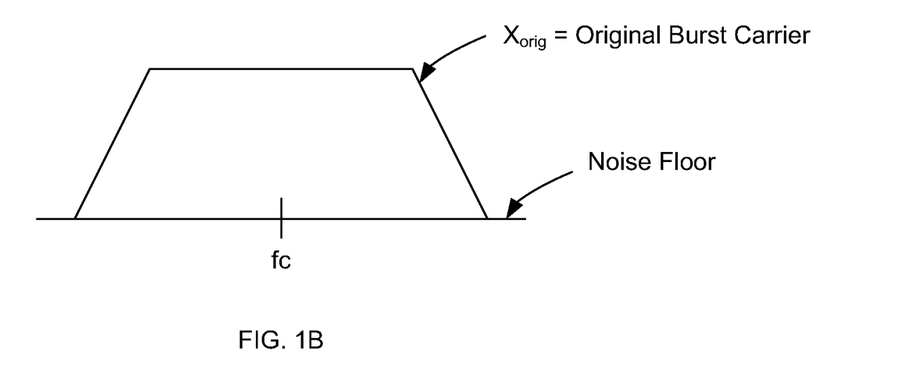
Figure 1C:
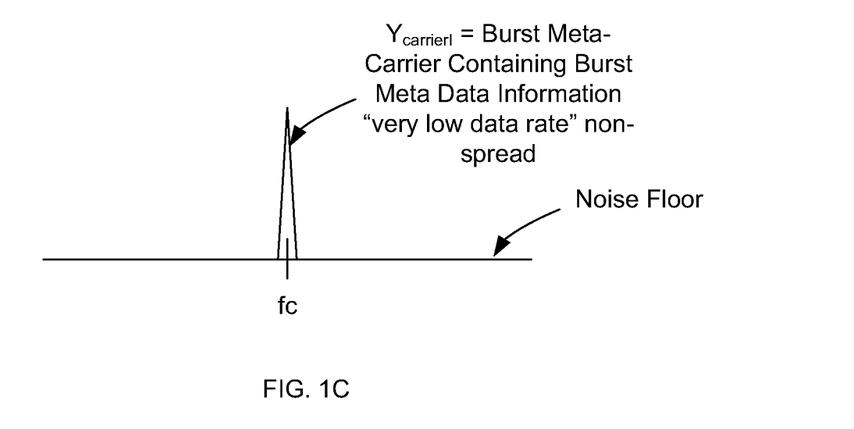
Figure 1D:
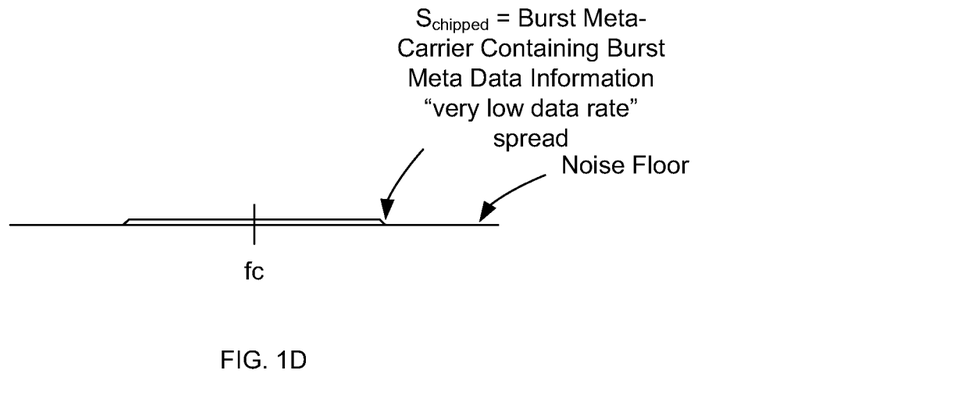
Figure 1E:
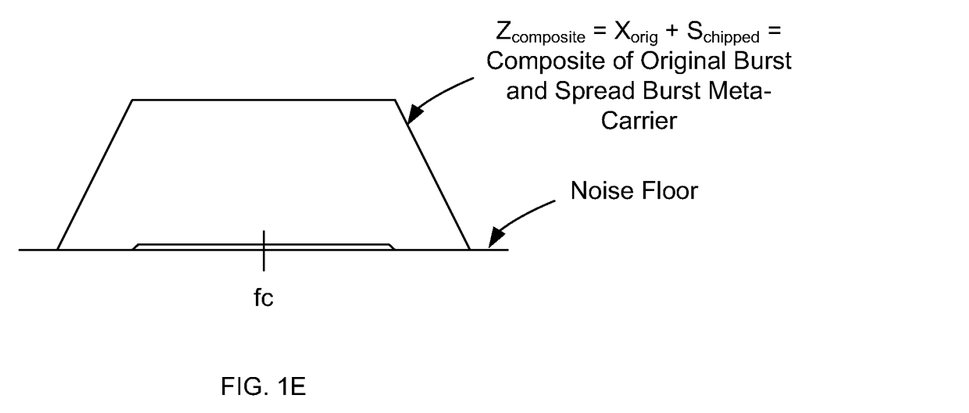

In the particular implementation illustrated in FIGS. 1A-E, the carrier information is shown as a low-rate (non-spread) carrier, $y_{CarrierI}(t)=B_I \cos(\omega_c t+\phi_c)+B_Q \sin(\omega_c t+\phi_c)$, as represented in FIG. 1C as $Y_{CarrierI}$, prior to being spread. The burst meta-carrier is present upon detection of presence of the original burst carrier. Upon detection of the original burst carrier's center frequency, occupied bandwidth and power level, the burst meta-carrier is then made available to be combined with the original burst carrier. A time delay between the detection of the original burst carrier and the introduction of the burst meta-carrier results due to the processing time of the detection circuit and configuration of the burst meta-carrier. While not limited as such, Binary Phase Shift Keying (BPSK) or any other appropriate modulation format may be used to modulate the burst meta-carrier. Once the low-data rate burst meta-carrier is spread or chipped, the waveform may be the spread burst meta-carrier and represented as $s_{chipped}(t)=Bchipped_I \cos(\omega_c t+\phi_c)+Bchipped_Q \sin(\omega_c t+\phi_c)$. As one skilled in the art would refer, the low-data rate spread burst meta-carrier is then combined with the original burst carrier to create a composite burst carrier also shown in FIG. 1E as $Z_{composite}=X_{orig}+S_{chipped}$. Therefore, knowing the energy of the signal to noise density of the original burst carrier $X_{orig}$ (Es/No) of $X_{orig}$, and knowing that the processing gain $G_p$ of a low data rate burst meta-carrier that has been chipped, $S_{chipped}$, is $10 \log(BW_{RF}/Data_{CarrierID})$, the result is a signal that has been chipped by many tens, hundreds, thousands, or even millions of times, and the ratio of $X_{orig}$ to $S_{chipped}$ is many times greater than $X_{orig}$.

The $BW_{RF}$ bandwidth is the 3 dB or 99% bandwidth of the chipped waveform. For example, assuming an original burst carrier with a $BW_{RF}$ of 64 KHz is detected with a burst duration of 100 milliseconds, and the burst meta-carrier uses a spread factor of 64, the processing gain $G_p$ with a spread factor of 64 can be expressed in Decibels (dB) as $10 \log(64)=18.06$ dB. The duration of 100 milliseconds would support a message operating at 1,000 bits per second for a duration 100 milliseconds (100 bits or approximately 12 bytes) to be transmitted. As a second example, assuming a original burst carrier with a $BW_{RF}$ of 256 KHz is detected with a burst duration of 50 milliseconds, and the burst meta-carrier uses a spread factor of 128, the processing gain $G_p$ with a spread factor of 128 can be expressed in Decibels (dB) as $10 \log(128)=21.07$ dB. The duration of 50 milliseconds would support a message operating at 2,000 bits per second for a duration 50 milliseconds or 100 bits (approximately 12 bytes) to be transmitted. As a third example, assuming a burst carrier with a $BW_{RF}$ of 256 KHz is detected with a burst duration of 300 milliseconds, and the burst meta-carrier uses a spread factor of 256, the processing gain $G_p$ of a spread factor of 256 can be expressed in Decibels (dB) as $10 \log(256)=24.08$ dB. The duration of 300 milliseconds would support a message operating at 1,000 bits per second for a duration 300 milliseconds or 300 bits (approximately 37 bytes) to be transmitted.

Again, if one assumes the $X_{orig}$ original burst carrier's Es/No is 15 dB, and burst meta-carrier $S_{chipped}$ has a spreading attenuation of 24.08 dB relative to $X_{orig}$, the difference in the original burst carrier $X_{orig}$ to the spread burst meta-carrier $S_{chipped}$ is the difference in the realized units of energy as (Ec/No−Es/No): 24.08 dB−15.00 dB or 9.08 dB. Keeping the low-data rate burst meta-carrier information rate constant allows the original burst carrier, with more bandwidth, to always have higher Es/No properties, resulting in the spread burst meta-carrier to appear as low-level noise, thus minimally, if at all, degrading the Es/No of the original burst carrier $X_{orig}$.

The method described for embedding information about the origin and configuration of a burst carrier may be done in a multitude of ways. Two methods are described, but the method for embedding the burst meta-carrier information is not limited the two methods described. The burst meta-carrier information may be embedded by a burst meta-carrier embedding device 210 as an ancillary device, in an external manner as shown in FIG. 2 in a post modulation format after having been previously modulated by a modulator 200. The meta-carrier signal may then be routed to up conversion and power amplification devices 220 prior to transmission. This external or ancillary method may be considered inline and downstream (on the Intermediate Frequency (IF) or Radio Frequency (RF) side) of the modulating device 200. The external or ancillary device 210 may be required to detect the presence of the burst and apply the meta-carrier to the burst. An alternative approach may be taken to embed the meta-carrier information as part of the modulation process and reside within the burst modulator device as shown in FIG. 3. The internal method may be considered direct embedding of the meta-carrier information within the burst carrier.

Figure 4:
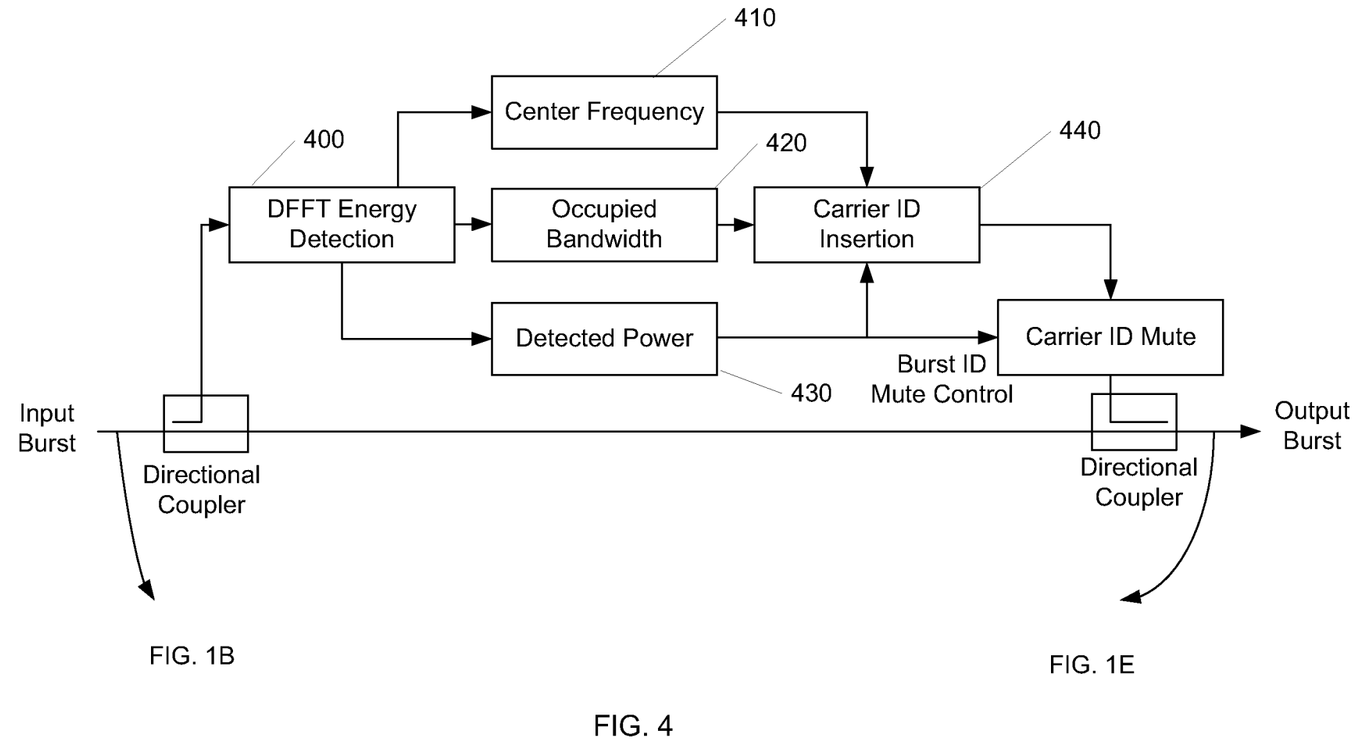
FIG. 4 is a block diagram of an implementation of a system configuration for transmit burst meta-carrier insertion.

As discussed above, FIG. 2 demonstrates the embedding of a burst meta-carrier in an "inline" auxiliary unit at the output of a modulated IF or RF carrier. However, a more detailed diagram of an implementation of this method is shown in FIG. 4. The inline method allows a burst carrier to be analyzed via a Discrete Fast Fourier Transform (DFFT) 400 and the center frequency 410, 3 dB occupied bandwidth (99% bandwidth) 420, and power level 430 to be extracted. Once the original burst carrier's characteristics are obtained (for example, the center frequency, occupied bandwidth and power level), the $BW_{RF}$ may be applied to the waveform and the low-data rate burst meta-carrier may be embedded under the original burst carrier as previously described. The inline method may be independent of the type of modulation, symbol rate and original burst carrier power level observed on the input. The resulting burst meta-carrier may be inserted 440 under the original carrier and extended to the 3 dB (99% bandwidth) roll-off points of the original carrier. The burst meta-carrier information to be embedded into the original burst carrier and may be provided in a multitude of ways, but is not limited to the methods described.

Figure 5:
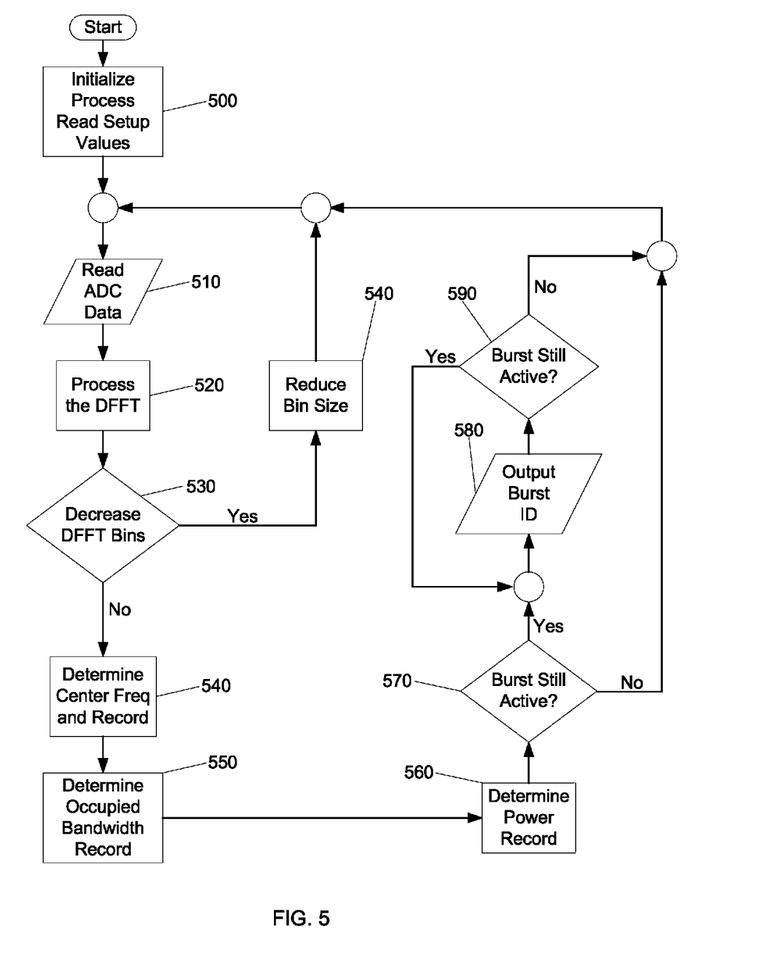
FIG. 5 is a logic flow diagram of an implementation of a method of burst meta-carrier insertion and transmission.

FIG. 5 provides a logic flow diagram of an implementation of a method for the insertion of the burst meta-carrier within at least a portion of the bandwidth of an original carrier signal. The initialization process 500 starts by setting up the DFFT parameters and the initialization of all values in the logic device. Once the logic device is initialized, then the Analog-to-Digital Converter (ADC) may be read 510 and information passed to the DFFT to start processing 520. Recurring processing may be performed by the DFFT to determine the presence of a burst of energy and when this burst of energy is found, a loop may be entered to attempt the reduction of the bins 540 to find the point where the bins are wide enough 530 to find center frequency 540, occupied bandwidth 550 and power to be extracted and stored 560. A decision is then made to see if the burst is still active 570, and an attempt may be made to transmit the burst meta-carrier 580. A time delay may result between the detection of the original burst carrier and the transmission of the burst meta-carrier due to the processing time for the determination of the characteristics of the original burst carrier and the configuration of the burst meta-carrier. A check may be made to see if the original burst carrier is still active 590, and if still active, then the burst meta-carrier continues to transmit 580. If the original burst carrier is no longer present, then the burst-meta carrier stops being transmitted and the process returns back to looking for a burst. Once a loop has been entered to transmit the burst meta-carrier, transmission 580 will continue until the original burst carrier's burst is no longer detected.

FIG. 3 demonstrates an implementation in which the modulating unit 300 directly embeds the burst meta-carrier as part of the baseband modulation prior to any up conversion and power amplification processes 310 that precede transmission of the composite carrier signal. This composite burst carrier embedding method allows any original burst carrier to have the burst meta-carrier injected after native pulse shaping Nyquist filtering. Since the center frequency, occupied bandwidth and power level are known (a priori), the carrier ID insertion module may be used to insert the burst meta-carrier into the burst carrier containing user information. As previously described, the $BW_{RF}$ may be applied to the waveform and the low-data rate burst meta-carrier may be embedded under the original burst carrier as previously described. The direct insertion method may be independent of the type of modulation, symbol rate and carrier power level observed on the input. The resulting burst meta-carrier may then be inserted under the original burst carrier and extended to the 3 dB (99% bandwidth) roll-off points of the original carrier.

The information contained in the burst meta-carrier may be small, since the duration of a burst is typically small. Therefore, the information contained in the burst may be limited to information such as, but not limited to, a manufacturer identification, model number and/or serial number. The entire identification sequence may be limited to a discrete quantity, for example, to only 40 bits (or 5 bytes). To illustrate an example, a reasonable use of the identification may be an identification sequence that may have one byte containing a manufacturer's identification, one byte containing a model number, and three bytes containing a serial number. A one-byte manufacturer identification could provide 256 manufactures, a one-byte model can provide 256 models, and a three-byte serial number can provide 16,777,216 devices per manufacturer.

Figure 6:
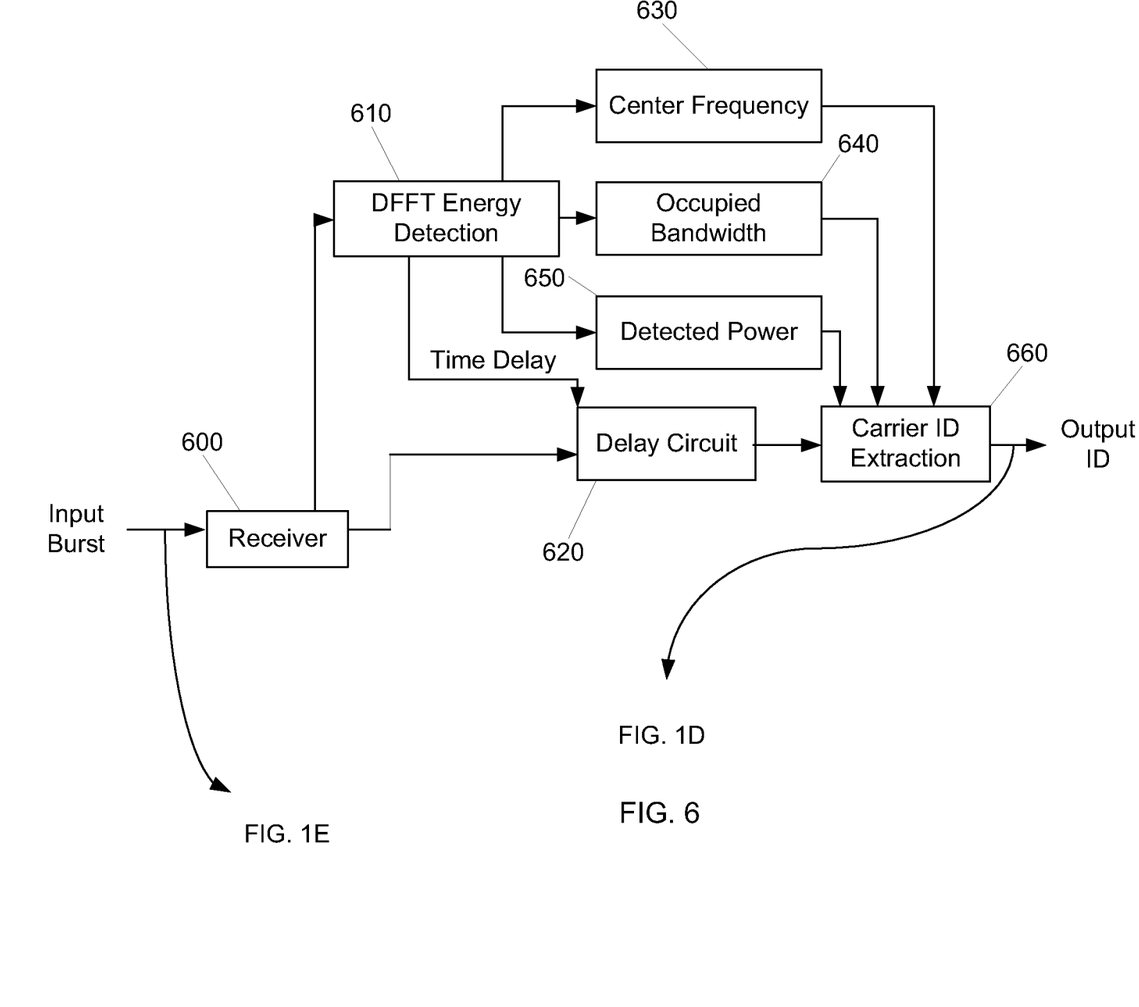
FIG. 6 is a block diagram of an implementation of a configuration for received burst meta-carrier detection.

FIG. 6 an implementation of burst meta-carrier receiving and decoding. The input containing the carrier may be received by a receiver 600, converted to a digitally sampled signal and provided to a Discrete Fast Fourier Transform (DFFT) detection circuit 610 and a variable delay circuit 620. The DFFT's output may provide the center frequency 630, occupied bandwidth 640 and power level 650 and is then fed to the carrier ID extraction circuit 660. The DFFT energy detection circuit 610 may provide time delay offset information to the delay circuit 620. The delay circuit 620 may provide variable delay on a burst-by-burst basis to steer or guide the delay circuit 620 to apply the appropriate delay to retain the input samples long enough to hold the samples so the center frequency 630, occupied bandwidth 640, and detected power 650 may be extracted. Once the required information has been extracted from the received burst, the appropriate delay is applied and the carrier ID extraction may be applied to the incoming waveform. The carrier may be then be despread 670 and the output ID may be provided for use by the user. The output ID may be provided in the form of a string of bits, bytes or characters for a display device, analyzer, or a computing platform such as a personal computer.

Figure 7:
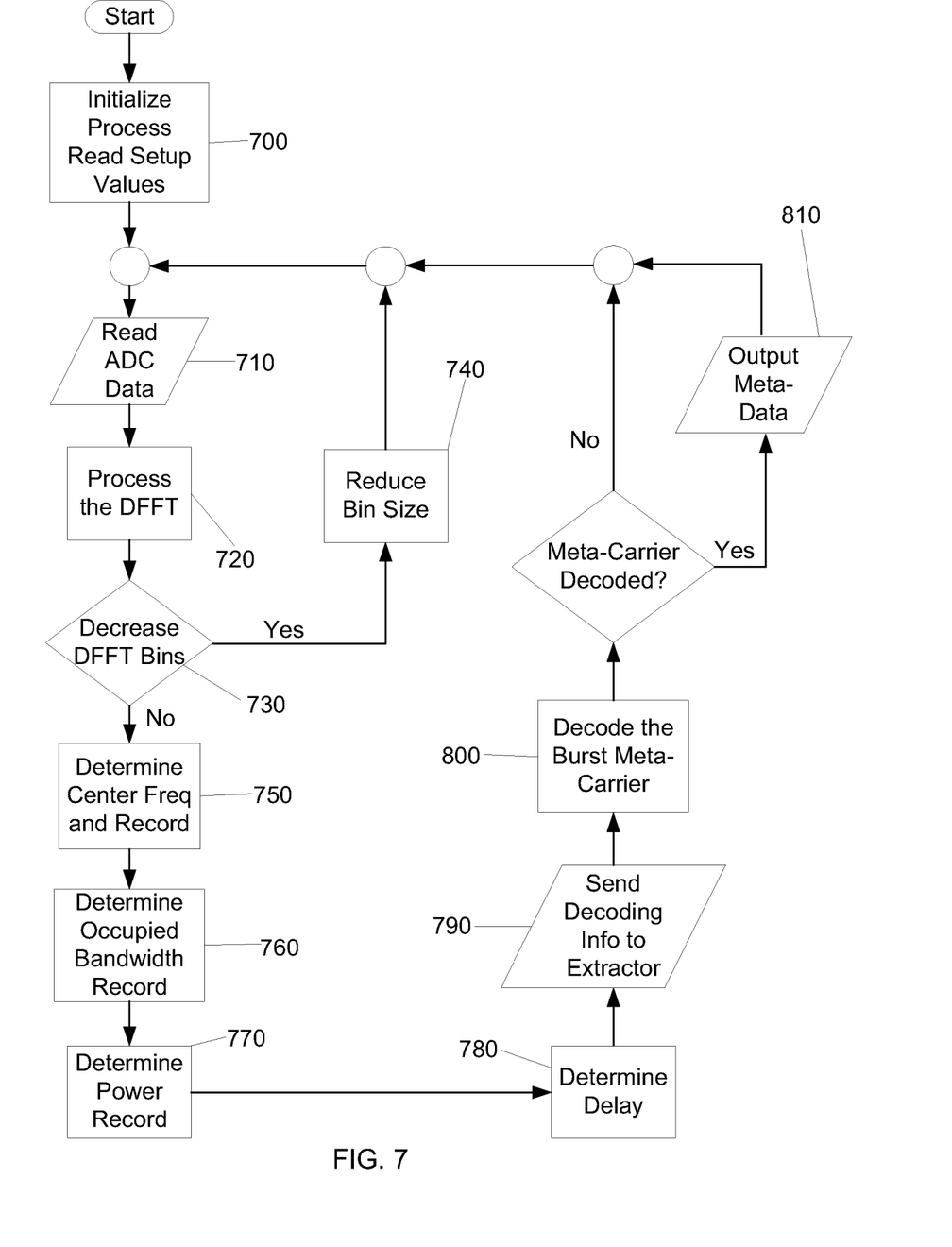
FIG. 7 is a logic flow diagram of an implementation of a method of detecting a received burst meta-carrier.

FIG. 7 illustrates a logic flow diagram of an implementation of a method for receiving and decoding the burst meta-carrier. The initialization process 700 starts by setting up the DFFT parameters and the initialization of all values in the logic device. Once the logic device is initialized, then the Analog-to-Digital Converter (ADC) is read 710 and information is passed to the DFFT to start processing. Recurring processing is performed by the DFFT 720 to determine the presence of a burst of energy and when energy is found a loop is entered to attempt the reduction of the bins 740 to find the point where the bins are wide enough 730 to find center frequency 750, occupied bandwidth 760 and power can be extracted and stored 770. The digitized (digitally sampled) input is stored in an FIFO, and when the DFFT determines the required information to decode the burst meta-carrier, the information is sent to the carrier ID extraction circuit 790 for decoding 800. The information may be comprised of the center frequency, occupied bandwidth, power level and delay 780 that has occurred from the time the burst was detected until the information has been made available for processing. The FIFO may be advanced forward by a time delay to allow the carrier ID extraction device to then extract the burst meta-carrier if one is present. If the burst meta-carrier is present, the burst meta-carrier may be extracted and then sent to the despreading circuit and the meta-data may be output 810 to the user. If no burst meta-carrier is found, then the logic may return back to the reading the ADC data 710, e.g. looking for energy in the form of a burst carrier. To better extract the meta-carrier, a burst may be stored for re-processing in an iterative fashion. In this configuration, logic may be added to steer/guide the processes for determining the center frequency, occupied bandwidth, power level and delay to better estimate the characteristics of the meta-carrier for each iterative pass of the detected energy burst.

In places where the description above refers to particular implementations of to telecommunication systems and techniques for transmitting data across a telecommunication channel, it should be readily apparent that a number of modifications may be made without departing from the spirit thereof and that these implementations may be applied to other to telecommunication systems and techniques for transmitting data across a telecommunication channel.

The invention claimed is:

1. A method for identifying the presence of an electronic transmission comprising:
   detecting, by a detecting device, the presence of a burst of electromagnetic energy that results from the presence of a non-pulsed original carrier signal that comprises data to be transmitted during the presence of the burst of electromagnetic energy that lasts for a duration of time over which all of the data is transmitted prior to terminating the burst of electromagnetic energy; and
   transmitting, by a transmitting device, a spread spectrum meta-carrier signal within a portion of a bandwidth of the original carrier signal, wherein the meta-carrier signal contains information about the identity of the non-pulsed original carrier signal and is transmitted such that the meta-carrier signal occupies at least a portion of a bandwidth of the non-pulsed original carrier signal during the presence of the burst of electromagnetic energy while the data of the original carrier signal is transmitted.

2. The method of claim 1, wherein the non-pulsed original carrier signal is without information as to an identity of the non-pulsed original carrier signal.

3. The method of claim 1, further comprising detecting, by the detecting device, the presence of multiple bursts of electromagnetic energy that result from the presence of multiple data messages being transmitted by the non-pulsed original carrier signal.

4. The method of claim 1, wherein the meta-carrier signal occupies the entire bandwidth of the non-pulsed original carrier signal during the presence of each burst of electromagnetic energy.

5. The method of claim 1, further comprising detecting a center frequency and bandwidth of the non-pulsed original carrier signal.

6. The method of claim 5, further comprising applying an $n^{th}$ order non-linearity to the non-pulsed original carrier signal.

7. The method of claim 6, wherein the center frequency and bandwidth of the non-pulsed original carrier signal are detected using a Fourier Transform method.

8. The method of claim 1, further comprising extracting, using a directional coupler, the presence of the non-pulsed original carrier signal for embedding the meta-carrier signal.

9. The method of claim 5, further comprising determining a power level of the non-pulsed original carrier signal during the presence of the burst of electromagnetic energy.

10. The method of claim 1, further comprising muting, using a muting device, output of the meta-carrier signal until transmission is enabled.

11. The method of claim 1, wherein the meta-carrier signal has a fixed duration that results in the meta-carrier signal occupying a narrow bandwidth within the burst of electromagnetic energy.

12. The method of claim 11, wherein the meta-carrier signal comprises a number of symbols that is less than a number of symbols that comprises complete meta-data.

13. The method of claim 12, further comprising detecting multiple bursts wherein the number of symbols of each burst is less than the number of symbols of the complete meta-data.

14. The method of claim 1, wherein the meta-carrier signal is contained within a 3 dB bandwidth of the burst of electromagnetic energy.

15. The method of claim 1, wherein the meta-carrier signal extends beyond the bandwidth of the burst of electromagnetic energy.

16. The method of claim 1, further comprising embedding, using an embedding device and combining the meta-carrier signal with the non-pulsed original carrier signal such that a composite carrier signal results.

17. The method of claim 1, further comprising:
   encoding, using an encoder, the meta-carrier signal;
   modulating, using a modulator, the encoded meta-carrier signal received from the encoder;
   spreading, using a spreader, the modulated meta-carrier signal; and
   combining, using a meta-carrier embedding device, the spread meta-carrier signal and the non-pulsed original carrier signal such that a composite carrier signal results.

18. The method of claim 1, wherein the meta-carrier signal is a limited duty cycle data sequence comprising a sequence of bits.

19. The method of claim 18, wherein the sequence of bits comprises a serial number or unique data sequence.

20. The method of claim 1, further comprising:
   outputting stored meta-carrier information as a repeating sequence of bytes; and
   identifying the meta carrier using a unique string of bits within the repeating sequence of bytes, the unique string of bits being unique to a transmission site.

21. The method of claim 1, further comprising embedding, using a directional coupler, the meta-carrier signal within the non-pulsed original carrier signal such that a composite carrier signal results.

22. The method of claim 1, further comprising storing, by the detecting device, a sequence of data detected during the presence of the burst of electromagnetic energy.

23. The method of claim 22, further comprising:
determining a time delay to impose such that a beginning of a burst electromagnetic energy is estimated; and
decoding with a decoder, the meta-carrier signal at the beginning of the burst of electromagnetic energy.

24. The method of claim 17, further comprising:
separating, by a separating device, the composite carrier signal in to the non-pulsed original carrier signal and the spread meta-carrier signal;
despreading, using a despreader, the spread meta-carrier signal;
demodulating, using a demodulator, the despread meta-carrier signal; and
decoding, using a decoder, the demodulated meta-carrier signal.

25. The method of claim 22, further comprising extracting, using an extraction device, the meta-carrier signal from the burst of electromagnetic energy based on the sequence of data stored relating to a prior burst of electromagnetic energy.

26. The method of claim 22, further comprising determining whether a meta-carrier signal is present by attempting to extract the meta-carrier signal from the composite carrier signal.

27. The method of claim 22, further comprising using one or more digital signal processing techniques to iteratively process the composite carrier signal to attempt to extract the meta-carrier signal.

28. A system for identifying the presence of an electronic transmission comprising:
a detecting device that detects a presence of a burst of electromagnetic energy that results in the presence of a non-pulsed original carrier signal that comprises data to be transmitted during the presence of the burst of electromagnetic energy that lasts for a duration of time over which all of the data is transmitted prior to terminating the burst of electromagnetic energy; and
a transmitting device that transmits a spread spectrum meta-carrier signal within a portion of a bandwidth of the non-pulsed original carrier signal, wherein the meta-carrier signal contains information about the identity of the no-pulsed original carrier signal and is transmitted such that the meta-carrier signal occupies at least a portion of a bandwidth of the non-pulsed original carrier signal during the presence of the burst of electromagnetic energy while the data of the non-pulsed original carrier signal is transmitted.

29. The system of claim 28, wherein the non-pulsed original carrier signal is without information as to an identity of the non-pulsed original carrier signal.

30. The system of claim 28, wherein the detecting device further detects the presence of multiple bursts of electromagnetic energy that result from the presence of multiple data messages being transmitted by the non-pulsed original carrier signal.

31. The system of claim 28, wherein the meta-carrier signal occupies the entire bandwidth of the non-pulsed original carrier signal during the presence of each burst of electromagnetic energy.

32. The system of claim 28, wherein the detecting device detects a center frequency and bandwidth of the non-pulsed original carrier signal.

33. The system of claim 32, further comprising:
an $n^{th}$ order non-linearity that is applied to the non-pulsed original carrier signal.

34. The system of claim 33, wherein the center frequency and bandwidth of the non-pulsed original carrier signal are detected using a Fourier Transform method.

35. The system of claim 28, further comprising a directional coupler that extracts the non-pulsed original carrier signal for embedding the meta-carrier signal.

36. The system of claim 32, further comprising a receiving device that determines a power level of the non-pulsed original carrier signal during the burst of electromagnetic energy.

37. The system of claim 28, further comprising a muting device that mutes the output of the meta-carrier until transmission is enabled.

38. The system of claim 28, wherein the meta-carrier signal has a fixed duration that results in the meta-carrier signal occupying a narrow bandwidth within the burst of electromagnetic energy.

39. The system of claim 38, wherein the meta-carrier signal comprises a number of symbols that is less than a number of symbols that comprises complete meta-data.

40. The system of claim 39, further comprising detecting multiple bursts wherein the number of symbols of each burst is less than the number of symbols of the complete meta-data.

41. The system of claim 28, wherein the meta-carrier signal is contained within a 3 dB bandwidth of the burst of electromagnetic energy.

42. The system of claim 28, wherein the meta-carrier signal extends beyond the bandwidth of the burst of electromagnetic energy.

43. The system of claim 28, further comprising an embedding device that embeds and combines the meta-carrier signal with the non-pulsed original carrier signal such that a composite carrier signal results.

44. The system of claim 28, further comprising:
an encoder that encodes the meta-carrier signal;
a modulator that modulates the encoded meta-carrier signal received from the encoder;
a spreader that spreads the modulated meta-carrier signal; and
a meta-carrier embedding device that combines the spread meta-carrier signal and the non-pulsed original carrier signal such that a composite carrier signal results.

45. The system of claim 28, wherein the meta-carrier signal is a limited duty cycle data sequence comprising a sequence of bits.

46. The system of claim 45, wherein the sequence of bits comprises a serial number or unique data sequence.

47. The system of claim 28, further comprising:
an output device that outputs stored meta-carrier information as a repeating sequence of bits; and
an embedding device that generates the meta-carrier signal as a carrier identification sequence.

48. The system of claim 28, further comprising a directional coupler that embeds the meta-carrier signal within the non-pulsed original carrier signal such that a composite carrier signal results.

49. The system of claim 28, wherein the detecting device stores a sequence of data detected during the presence of the burst of electromagnetic energy.

50. The system of claim 49, further comprising:
a receiving device that determines a time delay to impose such that a beginning of a burst of electromagnetic energy is estimated; and
a decoder that decodes the meta-carrier signal at the beginning of the presence of a burst of electromagnetic energy.

51. The system of claim 49, further comprising:
- a separating device that separates the composite carrier signal in to the non-pulsed original carrier signal and the spread meta-carrier signal;
- a despreader that dispreads the spread meta-carrier signal;
- a demodulator that demodulates the despread meta-carrier signal; and
- a decoder that decodes the demodulated meta-carrier signal.

52. The system of claim 49, further comprising an extraction device that extracts the meta-carrier signal from the burst of electromagnetic energy based on the sequence of data stored relating to a prior burst of electromagnetic energy.

53. The system of claim 49, further comprising an extraction device that attempts to extract the meta-carrier signal from the composite carrier signal and determines whether a meta-carrier signal is present.

54. The system of claim 49, further comprising a digital signal processor that uses one or more digital signal processing techniques to iteratively process the composite carrier signal to attempt to extract the meta-carrier signal.

\* \* \* \* \*